US006871798B2

(12) United States Patent
Mathiez

(10) Patent No.: US 6,871,798 B2
(45) Date of Patent: Mar. 29, 2005

(54) SPRAY DEVICE WITH COMBINED DRIVE AND RESILIENT PIVOTING HEAD FOR A SPRAY BOTTLE

(75) Inventor: Jean-Louis Mathiez, Limours (FR)

(73) Assignee: Coty S. A., Paris (FR)

( * ) Notice: Subject to any disclaimer, the term of this patent is extended or adjusted under 35 U.S.C. 154(b) by 194 days.

(21) Appl. No.: 10/379,391

(22) Filed: Mar. 3, 2003

(65) Prior Publication Data

US 2004/0089741 A1 May 13, 2004

(30) Foreign Application Priority Data

Oct. 26, 2002 (FR) .......................................... 02 13367

(51) Int. Cl.[7] ......................... A62C 13/62; A62C 11/00; A01G 25/14

(52) U.S. Cl. ....................... 239/302; 239/331; 239/333; 239/356; 239/375; 239/378

(58) Field of Search ................................ 239/302, 331, 239/333, 334, 327, 328, 363, 378, 375, 356

(56) References Cited

U.S. PATENT DOCUMENTS 3,581,998 A * 6/1971 Roche ........................ 239/415
4,020,978 A * 5/1977 Szczepanski ................ 222/209
4,057,177 A * 11/1977 Laauwe ...................... 222/215
4,146,182 A * 3/1979 Nilson ........................ 239/323
4,667,881 A * 5/1987 Michelotti .................. 239/375

FOREIGN PATENT DOCUMENTS

EP 0 449 046 10/1991 ........... B05B/11/00
EP 0 734 783 10/1996 ........... B05B/11/00

* cited by examiner

*Primary Examiner*—Davis Hwu
(74) *Attorney, Agent, or Firm*—Schwegman, Lundberg, Woessner & Kluth, P.A.

(57) ABSTRACT

The invention relates to a liquid spray bottle with combined drive, equipped with a liquid propulsion member (50) that has a main axis of translation (X'X) coupled, on the one hand, to a spray member (9) comprising a nozzle (11) having an axis of diffusion (Y'Y) and, on the other hand, to a container (3) containing the liquid. The spray bottle comprises a rigid casing (1*a*, 1*b*; 20*a*, 20*b*) which partially surrounds the container (3) and which extends roughly in a main plane (P) containing the axis of translation (X'X), a connecting member (13) connecting the spray head (9) and the casing, and a region (7, 10*d*) of sliding between the container and the casing, so that manual thrust ($\vec{F}_1$) exerted laterally on the container in the main plane (P) of the casing causes, through a combination of the action of the sliding ramp (10*d*) and of the connecting member (13), actuation of the propulsion member (50) to spray the liquid and a movement of the bottle, with respect to the casing, in a pendular movement about an axis of pivoting located near the propulsion member (50) and which, by converting the movement, generates translation along said axis of translation (X'X) to actuate the spraying of the liquid through the nozzle (11).

15 Claims, 4 Drawing Sheets

SPRAY DEVICE WITH COMBINED DRIVE AND RESILIENT PIVOTING HEAD FOR A SPRAY BOTTLE

Figure 1:
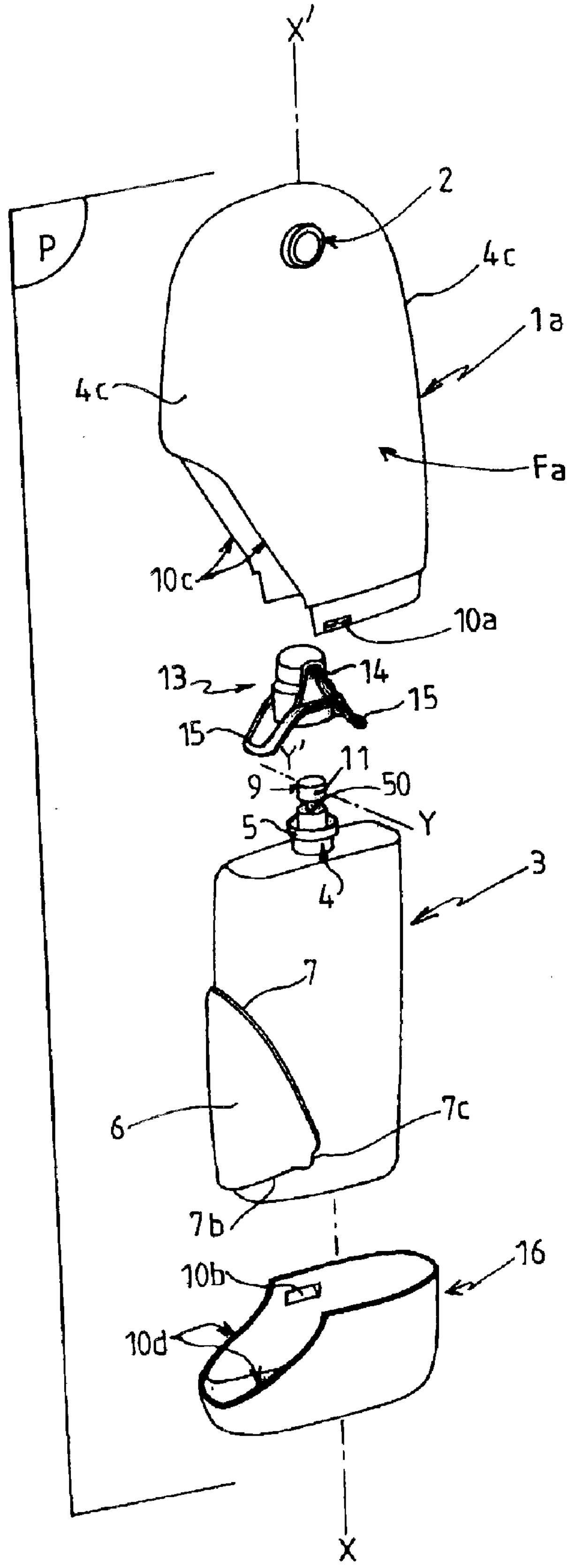

This application claims priority to French Patent Application No. 02 13367, filed Oct. 26, 2002, which is incorporated herein by reference.

The invention relates to a spray device with combined drive, that is to say an atomizer or aerosol intended to spray a liquid, particularly a fragrance, a perfume or an eau de toilette contained in a bottle, this spray bottle being equipped with a propulsion member operating according to the member according to the invention.

Conventionally, there are two types of spraying: aerosols, which comprise a propellant gas released through the opening of the valve shutter of a valve to drive the liquid, and atomizers, the pump of which propels the liquid via the pressure mechanically exerted by a piston. The "valve—valve shutter" or "pump—piston" assemblies are hereinafter referred to as propulsion member. To actuate spraying, the spray bottle is equipped with a push-button which the user presses in order to introduce into the flow duct of the propulsion member the liquid contained in a bottle. Spraying is in fine droplets through an outlet nozzle mounted on the push-button.

In other embodiments of the prior art, an atomizer lever, adopting the form of a trigger which actuates spraying. This type of spray bottle, as illustrated for example in patents EP 0 449 046 or EP 0 734 783, finds applications in the household or hygiene sector (for cleaning windows, deodorizing, etc.).

Elsewhere, document EP 0 276 799 proposes packaging for a product in which the outlet nozzle is kept fixed and the push-button is connected to the nozzle by a flexible pipe.

These techniques are relatively tricky and/or complicated and do not offer any valuable alternatives to the push-button when the issue is one of producing a well-presented and attractive look, particularly in the sphere of perfumery, while at the same time remaining at reasonable production cost.

The invention sets out to produce a look of this type by virtue of another approach that also makes it possible to simplify assembly. To do this, it is proposed that the pressure and spraying generating movement be actuated not by pressing the push-button but by moving the bottle laterally in a rotational movement coupled with a translational movement.

More specifically, the subject of the present invention is a liquid spray device with combined drive, equipped with a liquid propelling member that has a main axis of translation coupled, on the one hand, to a spray head comprising a nozzle having an axis of diffusion and, on the other hand, to a container containing the liquid. This device comprises a rigid casing which partially surrounds the container and which extends roughly in a main plane containing the axis of translation, a connecting member connecting the spray head and the casing, and a region of sliding between the container and the casing, so that manual thrust exerted laterally on the container in the main plane of the casing causes, through a combination of the action of the sliding region and of the connecting member, actuation of the propulsion member to spray the liquid and a movement of the bottle, with respect to the casing, in a pendular movement about an axis of pivoting located near the propulsion member and which, by converting the movement, generates translation along said axis of translation to actuate the spraying of the liquid through the nozzle.

According to particular embodiments, the movement is converted by the bottle bearing on the casing along at least one linear or curved portion, for example in the form of a spiral or ellipse, or by an articulation with two axes of rotation, that is to say of the rod-crank type.

Advantageously, this spray bottle may comprise two half-shells assembled to form a shell to clad the bottle. The shell has at least one stop for the actuating member and a slide which produces contact with a region of the bottle, and two openings, an opening for the diffusion of the liquid sprayed by the nozzle and an opening for access to the bottle which opening is formed by a cut-out on part of the shell, the cut-out and the slide being arranged in such a way that pressure exerted on the bottle through this cut-out causes the region of contact of the bottle to move along the slide.

According to some particular embodiments:

- the stop is formed by means of articulation and of clipping onto the actuating member;
- the sliding region is produced by a ramp formed in the cut-out associated with a channel in the bottle portion formed as a protrusion;
- the half-shells, made of polypropylene or of polyethylene terephthalate, are equipped with means of assembly by locking to one another, the plane where these half-shells meet being roughly parallel or perpendicular to the longitudinal axis of the bottle, it being possible for the half-shells to be of the same size or of somewhat different sizes, it being possible for example for one half-shell to form a cap.

Another aspect of the invention relates to the problem posed by dimensional tolerances, particularly when the bottle is made of glass, because the bottle needs to be held firmly in position. Taking the existence of these tolerances into consideration makes it possible to produce a spray bottle which can operate with bottles the dimensions of which vary according to these tolerances.

In order to absorb such tolerances, the invention proposes a resilient pivoting head coupled to the actuating member, of the push-button type, or which can be substituted for the latter through the incorporation of the means of connection to the liquid propulsion member and to the nozzle duct.

The pivoting head bears around an articulation allowing the head to turn about an axis parallel to the axis of diffusion. As a preference, the articulation is produced by a plugging-together of the male-female variety providing connection and guidance of the pivoting head on the shell.

Such a head comprises a guide and axial abutment body for the propulsion member, a guide for orientating the nozzle during assembly, and a spring part, for example elastic arms which bear on shoulders of the bottle. The spring part then has a dual role:

- to strengthen the action of the propulsion member by, in particular, encouraging the bottle to return to the centered position after use, creating an axial clearance that guarantees sealing of the propulsion member;
- to compensate for the dimensional tolerances of the glass by holding the bottle firmly as the result of precompression exerted on the bottle during its fitment.

The pivoting head is made of a resilient thermoplastic, for example polyoxymethylene or polypropylene and is preferably obtained by injection molding.

The invention advantageously allows the use of interchangeable refill cartridges comprising a bottle, of modest cost.

Figure 2C:
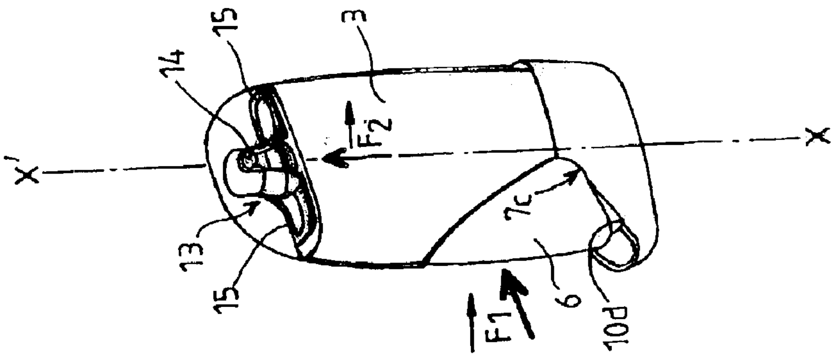
Figure 2B:
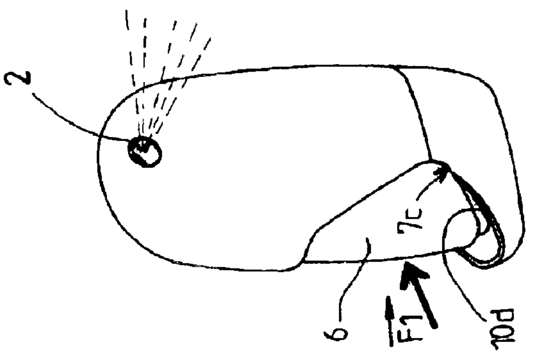
Figure 2A:
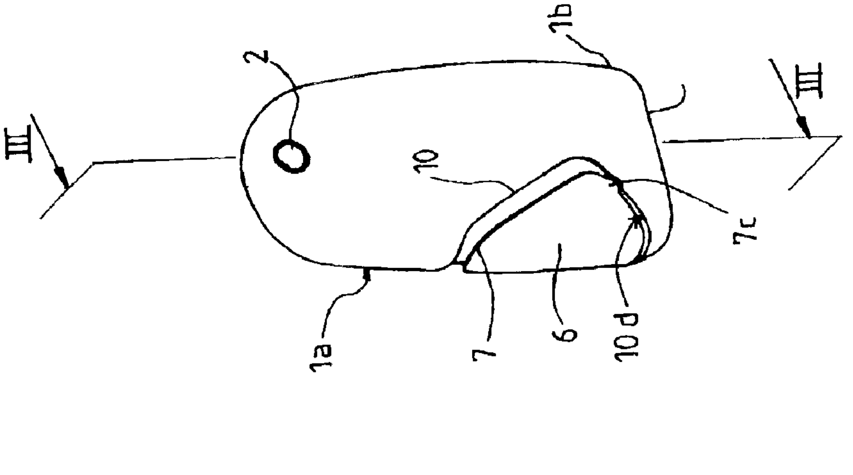
Figure 3:
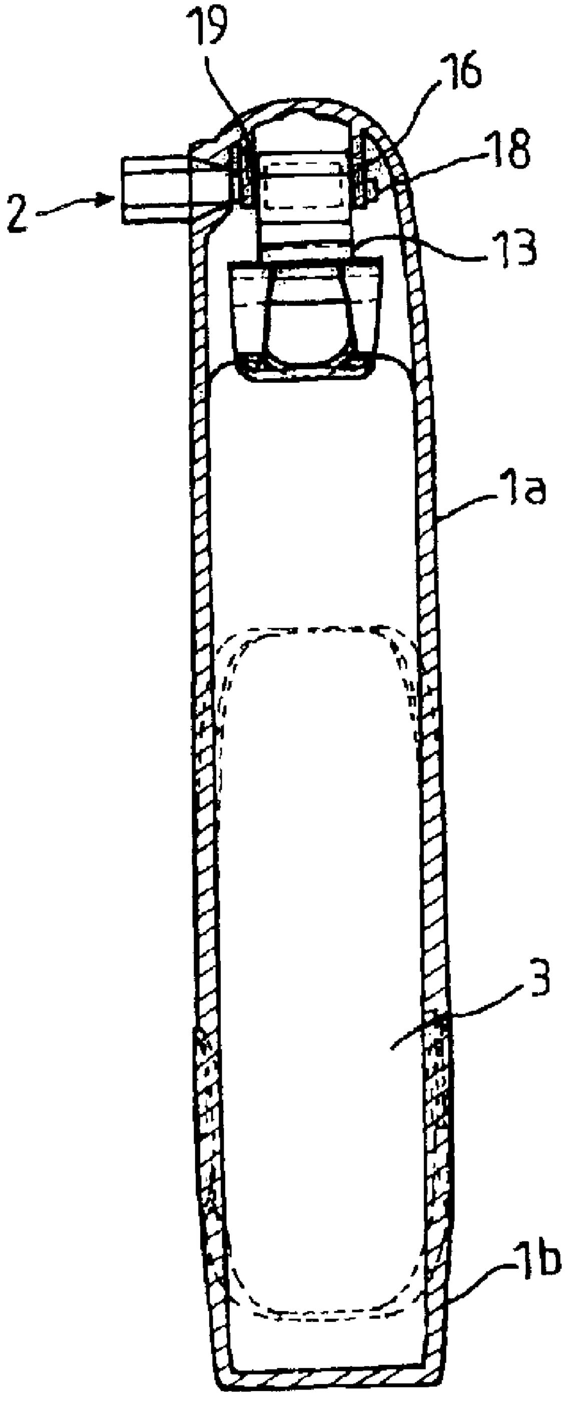

Other characteristics and advantages of the invention will become apparent from reading the description which follows of some detailed examples which are accompanied by the appended drawings which, respectively, depict:

FIG. 1, an exploded view of a first example of a spray bottle according to the invention, formed of half-shells which meet in a transverse plane;

FIGS. 2*a* to 2*c*, perspective views, after assembly, of the exemplary spray bottle according to FIG. 1, respectively at rest, in action, and with the upper half-shell transparent;

FIG. 3, a view in section on III—III of FIG. 2*a*; and

Figure 4A:
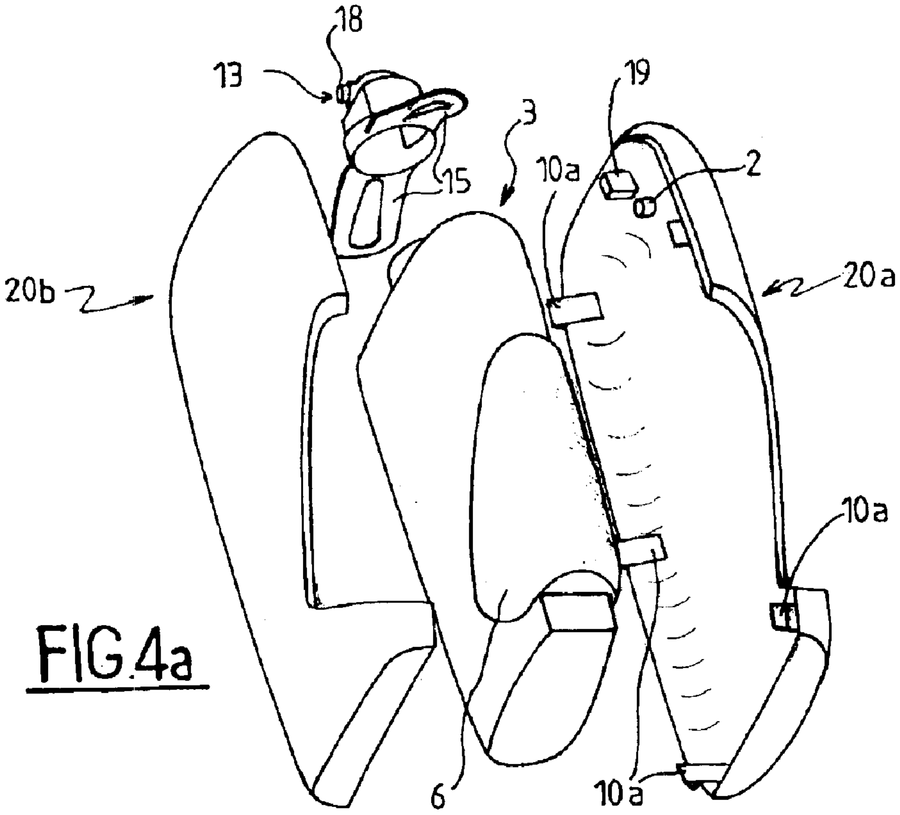
Figure 4B:
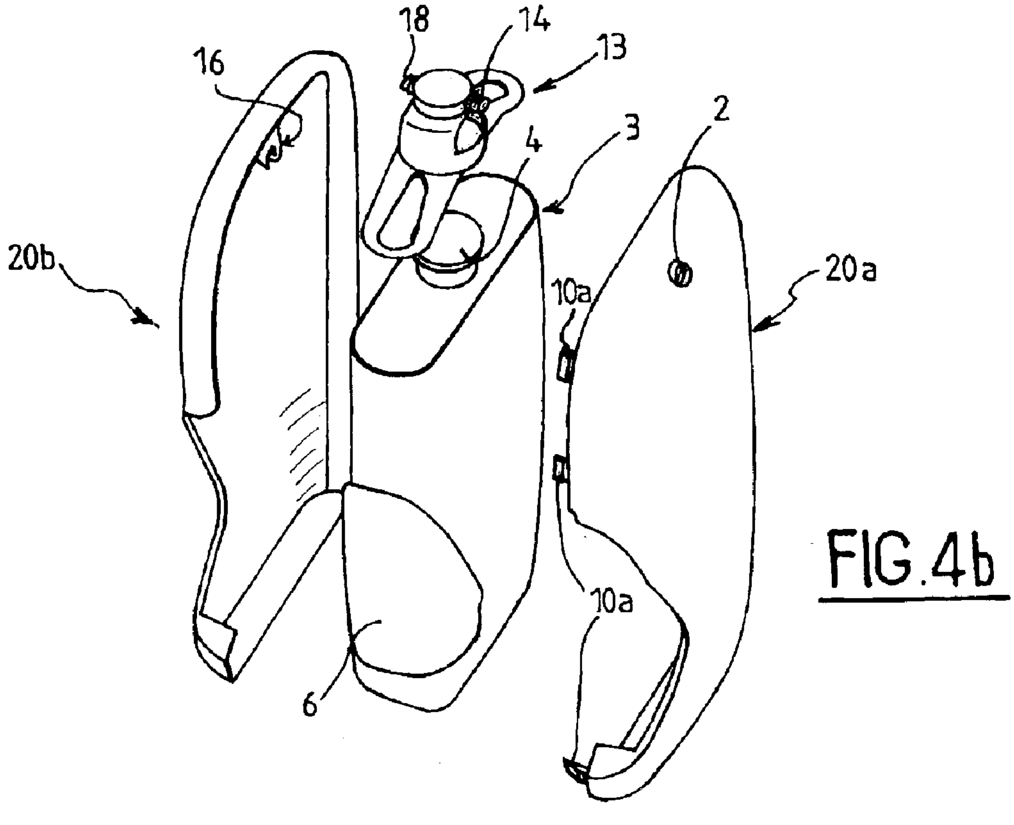

FIGS. 4*a* and 4*b*, exploded views in two different orientations of another exemplary spray bottle according to the invention, formed of half-shells which meet in a plane in the main plane.

With reference to the exploded view of FIG. 1, a spray bottle according to the invention comprises two cladding half-shells 1*a* and 1*b*, which meet in a plane which is transverse with respect to the main longitudinal axis X'X.

The half-shells have appreciably different sizes in the example illustrated, the upper half-shell having a spray opening 2 on a main face Fa through which a liquid can be sprayed in fine droplets.

The half-shells have molded-in assembly elements: retaining tabs 10*a* on one half-shell which are associated with recesses 10*b* formed on the other half-shell. The half-shells are cut to form main faces with upper 10*c* and lower 10*d* inclined sides.

The cladding is intended to envelop a glass bottle 3 the neck 4 of which is capped with a band 5 of the pump 50 the axis of translation of which, when not in use, coincides approximately with the axis X'X. The bottle has a shape which overall is parallelepipedal comprising two longitudinal main faces 4*a* and 4*b* extending in a main plane P and connected by two lateral faces 4*c* with continuous curvature. A protruding glass portion 6 extends symmetrically, from one lateral face 4*c*, along the longitudinal faces to cut off a triangle shape. The protruding portion 6 has a channel 7 connecting with the rest of the bottle.

The pump 50 propels the liquid contained in the bottle 3 by coupling to a spray push-button 9 comprising a nozzle 11 having an axis of diffusion Y'Y perpendicular to the main axis X'X. The push-button is housed in a pivoting head 13 which has an orifice 14 and two elastic lateral arms 15 intended to bear on the bottle 3.

The resilient pivoting head 13 is able to absorb dimensional tolerances. Such a head forms a guiding or axial abutment body for the push-button, and a guide for orientating the nozzle 11 via the rim of the orifice 14 at the time of assembly.

Once the parts have been assembled, the spray bottle has the configuration showed in the perspective view of FIG. 2*a*. The inclined sides 10*c* and 10*d* form a cut-out on each main face, of a size calculated to allow access to the protruding portion 6 of the bottle. The lower channel 7*b* of the protruding portion rests, via shoes 7*c*, on the inclined side 10*c* forming a sliding ramp.

A lateral thrust $\vec{F}_1$ (FIGS. 2*b* and 2*c*) is exerted on the bottle through this cut-out and causes the region of contact of the bottle to move along the slide on the protruding portion 6 of the bottle 3. In the main plane P, the bottle moves sideways, bearing against the slide and in translation along the axis X'X (arrow $\vec{F}_2$, FIG. 2*c*) because of the holding of the push-button, to form a movement of the pendular type about an instantaneous axis of pivoting located near the pump 50 and which, by conversion of movement, causes translation along the axis X'X. The pump is then actuated and propels the liquid to the push-button 9 held in position by an articulation stop between the head and the half-shell (see FIG. 3). The liquid is diffused through the nozzle 11 and the orifice 14.

Viewed in section on III—III of FIG. 2*a*, FIG. 3 more especially shows:

- the articulation stop between a groove-shaped housing 16 formed in the upper half-shell and an elongate wrist pin 18 of the head 13;
- a holding stop 19 formed in the upper half-shell to clip the orifice 14 of the pivoting head;
- the assembly of the coupling elements 10*a*–10*b* of the two half-shells, and
- the alignment of the opening 2 of the shell which houses the nozzle 11 of the push-button and of the orifice 14 of the pivoting head with the axis of diffusion Y'Y.

The articulation formed allows the head to turn about an axis parallel to the axis of diffusion Y'Y. The articulation provides the connection and guidance between the shell and the pivoting head.

The elastic arms 15 return to the bottle to its position after use, with the creation of an axial clearance on the push-button, guaranteeing pump sealing. In addition, the arms compensate for the dimensional tolerances of the glass by holding the bottle firmly in place as the result of precompression exerted on the bottle during its placement.

According to another exemplary embodiment illustrated in exploded views in FIGS. 4*a* and 4*b*, the spray bottle comprises two half-shells, a front one 20*a* and a rear one 20*b*, which meet in a plane formed in the main plane P, the glass bottle 3 and the pivoting head 13. In this solution, the pivoting head incorporates the means of connection to the propulsion pump and to the duct of the liquid propulsion duct nozzle so that the pivoting head acts as a push-button.

FIG. 4*a* more particularly shows the internal appearance of the front half-shell 20*a* which is equipped with the diffusion opening 2, and with tabs 10*a* for fixing to the other half-shell. FIG. 4*b* shows the inside of the rear half-shell 20*b* equipped with the protrusion 16 for housing the wrist pin 18 of the pivoting head 13.

The invention is not restricted to the exemplary embodiments described and depicted. The half-shells, made of polypropylene or of polyethylene terephthalate or other thermoplastics.

The pivoting head is made of a resilient thermoplastic, for example polyoxymethylene, and is obtained preferably by injection-molding.

Furthermore, the propulsion member may be a pump, a valve or any suitable pressure means known to those skilled in the art.

In addition, the liquid to be sprayed may be chosen from a cosmetic product, for example a cosmetic oil, a perfume and a skin-soothing product.

What is claimed is:

1. A liquid spray device with combined drive, equipped with a liquid propulsion member that has a main axis of translation coupled, on the one hand, to a spray member comprising a nozzle having an axis of diffusion and, on the other hand, to a container containing the liquid, which spray bottle comprises a rigid casing which partially surrounds the container and which extends roughly in a main plane containing the axis of translation, a connecting member connecting the spray head and the casing, and a region of sliding between the container and the casing, so that manual thrust exerted laterally on the container in the main plane of the casing causes, through a combination of the action of the sliding ramp and of the connecting member, actuation of the propulsion member to spray the liquid and a movement of the bottle, with respect to the casing, in a pendular movement about an axis of pivoting located near the propulsion member and which, by converting the movement, generates translation along said axis of translation to actuate the spraying of the liquid through the nozzle.

2. The spray device as claimed in claim 1, in which the movement is converted by the bearing of a protruding portion of the bottle on the casing along the sliding region formed by a linear or curved ramp of the casing, or by an articulation with two axes of rotation.

3. The spray device as claimed in claim 2, in which the casing comprises two half-shells assembled by locking means to form a shell to clad the bottle, the shell comprises at least one stop for the connecting member, the ramp is fairly inclined with respect to the main axis, and two openings, an opening for the diffusion of the liquid sprayed by the nozzle and an opening for access to the bottle which opening is formed by a cut-out on part of the shell, the cut-out being of a size calculated to allow access to the protruding portion of the bottle so that pressure exerted on the bottle through this cut-out causes a region of contact of the bottle to move along the ramp.

4. The spray device as claimed in the preceding claim, in which the stop is formed by means of articulation and of clipping onto the spray member.

5. The spray device as claimed in claim 3, in which the region of contact is produced by a sliding ramp formed in the cut-out associated with a connecting channel of the protruding portion of the bottle.

6. The spray device as claimed in any one of the preceding claims, in which the plane where the half-shells meet is roughly parallel to the longitudinal axis of the bottle.

7. The spray device as claimed in any one of claims 1 to 5, in which the plane where the half-shells meet is roughly perpendicular to the longitudinal axis of the bottle.

8. The spray device as claimed in any one of the preceding claims, in which the half-shells are made of polypropylene or of polyethylene terephthalate.

9. The spray device as claimed in any one of the preceding claims, in which the bottle is made of glass, the actuating member is a push-button and the connecting member is a resilient pivoting head coupled to the push-button.

10. The spray device as claimed in the preceding claim, in which the pivoting head acts as a pushbutton by incorporation of the means of connection to the propulsion pump and to the duct of the nozzle.

11. The spray device as claimed in claim 9 or 10, in which the pivoting head bears around an articulation allowing the head to turn about an axis parallel to the axis of diffusion.

12. The spray device as claimed in claim 11, in which the articulation is produced by a plugging-together of the male-female variety providing the connection and guidance between the shell and the pivoting head.

13. The spray device as claimed in any one of claims 9 to 12, in which such a head comprises an axial stop, guidance for the pump, a guide for orientating the nozzle during assembly and a spring part produced by elastic arms which bear on shoulders of the bottle.

14. The spray device as claimed in any one of claims 9 to 13, in which the pivoting head is made of polyoxymethylene or of polypropylene.

15. The spray device as claimed in any one of the preceding claims, in which the liquid to be sprayed is chosen from a cosmetic oil, a perfume and a skin-soothing product.

* * * * *